United States Patent
Yamashita et al.

(10) Patent No.: US 9,645,770 B2
(45) Date of Patent: May 9, 2017

(54) INFORMATION PROCESSING SYSTEM, INFORMATION PROCESSING APPARATUS, INFORMATION PROCESSING METHOD, AND STORAGE MEDIUM STORING PROGRAM

(75) Inventors: Hiroshi Yamashita, Tokyo (JP); Yoichi Matsuyama, Yokohama (JP); Yuji Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/333,750

(22) Filed: Dec. 21, 2011

(65) Prior Publication Data

US 2012/0182580 A1 Jul. 19, 2012

(30) Foreign Application Priority Data

Jan. 19, 2011 (JP) ................................ 2011-009200

(51) Int. Cl.
*G06K 15/00* (2006.01)
*G06F 3/12* (2006.01)

(52) U.S. Cl.
CPC ............ *G06F 3/1203* (2013.01); *G06F 3/127* (2013.01); *G06F 3/1267* (2013.01); *G06F 3/1288* (2013.01); *G06F 3/1246* (2013.01)

(58) Field of Classification Search
CPC combination set(s) only.
See application file for complete search history.

(56) References Cited

U.S. PATENT DOCUMENTS

| | | | |
|---|---|---|---|
| 2005/0275863 A1* | 12/2005 | Ota | 358/1.13 |
| 2006/0176498 A1 | 8/2006 | Wada et al. | 358/1.13 |
| 2006/0187485 A1* | 8/2006 | Lankreijer | G06F 3/122 358/1.15 |
| 2007/0005561 A1* | 1/2007 | Sakura et al. | 707/1 |
| 2007/0143354 A1* | 6/2007 | Morooka | 707/200 |
| 2008/0266594 A1* | 10/2008 | Lankreijer | G06F 3/1207 358/1.15 |
| 2009/0116060 A1* | 5/2009 | Yamamichi | 358/1.15 |
| 2009/0292708 A1* | 11/2009 | Sato | H04N 1/00222 |
| 2010/0039668 A1* | 2/2010 | Kayama | 358/1.15 |

FOREIGN PATENT DOCUMENTS

| | | |
|---|---|---|
| JP | 2005-242781 A | 9/2005 |
| JP | 2006-222661 | 8/2006 |
| JP | 2010-268314 A | 11/2010 |

OTHER PUBLICATIONS

U.S. Appl. No. 13/311,530, filed Dec. 5, 2011, Applicant: Yoichi Kodama, et al.
U.S. Appl. No. 13/323,476, filed Dec. 12, 2011, Applicant: Shogo Hagiwara, et al.

* cited by examiner

*Primary Examiner* — Idowu O Osifade
(74) *Attorney, Agent, or Firm* — Fitzpatrick, Cella, Harper & Scinto

(57) ABSTRACT

A first information processing apparatus inputs job data and a corresponding file associated with the job data to a hot folder of a second information processing apparatus. When the second information processing apparatus detects the corresponding file input to the hot folder, it determines whether the job data has been copied in the hot folder. If it is determined that the job data has been copied in the hot folder, the job data is processed.

15 Claims, 7 Drawing Sheets

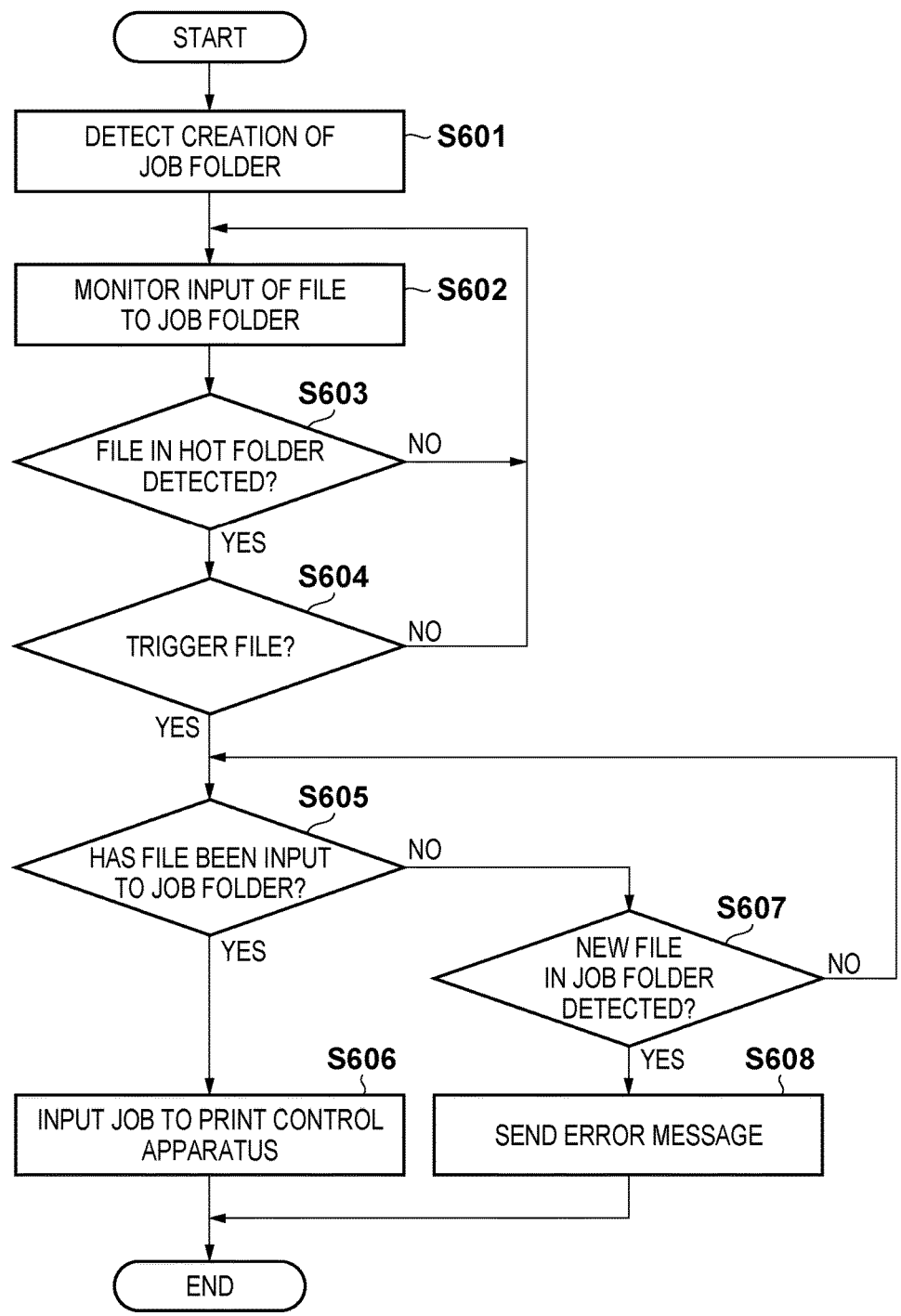

FIG. 7

```xml
<?xml version="1.0" encoding="UTF-8"?>
<cpf:JobTicketxmlns:cpf="http://www...com/common/cptfw"
xmlns:cpk="http://www...com/common/cptkw">
 <cpf:Job>
  <cpf:Property name="cpk:OrderId">
   <cpf:Value>222</cpf:Value>
  </cpf:Property>
   ...OMISSION...
  <cpf:Resources>
   <cpf:PrintTicketFile dataSize="43212" id="jobPT">JobPT.xml</cpf:PrintTicketFile>
   <cpf:PrintTicketFile dataSize="21458" id="pagePT01">PagePT.xml</cpf:PrintTicketFile>
   <cpf:Resource type="cpk:CorrectionTicket" id="ct001" dataSize="3210124">CT001.ct</cpf:Resource>
   ...OMISSION...
  </cpf:Resources>
  <cpf:PrintTicketRef>jobPT</cpf:PrintTicketRef>
  <cpf:Doc id="d001" startPage="1" endPage="24">
   <cpf:Page pageNo="1">
    <cpf:ObjectList>
     <cpf:ObjectItem id="p1-001">
      <cpf:Property name="cpk:ObjectResourceName">
       <cpf:Value>Im01-001</cpf:Value>
      </cpf:Property>
      <cpf:Property name="cpk:CorrectionTicketRef">
       <cpf:Value>ct001</cpf:Value>
      </cpf:Property>
     </cpf:ObjectItem>
     <cpf:ObjectItem id="p1-002">
      <cpf:Property name="cpk:ObjectResourceName">
       <cpf:Value>Im01-002</cpf:Value>
      </cpf:Property>
      <cpf:Property name="cpk:CorrectionTicketRef">
       <cpf:Value>ct001</cpf:Value>
      </cpf:Property>
     </cpf:ObjectItem>
    <cpf:ObjectList>
    <cpf:PrintTicketRef>pagePT01</cpf:PrintTicketRef>
   </cpf:Page>
   <cpf:Page pageNo="2">
   ...OMISSION...
</cpf:JobTicket>
```

FIG. 8

```xml
<?xml version="1.0" encoding="UTF-8"?>
<cpf:PrintTicket xmlns:cpf="http://www...com/common/cptfw"
 xmlns:cpk="http://www...com/commo/cptkw"
 xmlns:cpk-100="http://www...com/100/cptkw">
    <cpf:SelectiveParam name="cpk:MediaType">
      <cpf:Option>cpk-100:custom-media3</cpf:Option>
    </cpf:SlectiveParam>
    <cpf:SelectiveParam name="cpk:OutputColor">
      <cpf:Option>cpk-100:custom-color2</cpf:Option>
    </cpf:SelectiveParam>
    <cpf:SelectiveParam name="cpk:OutputMediaSize">
      <cpf:Option>cpk:4x6inch</cpf:Option>
    </cpf:SelectiveParam>
    <cpf:SelectiveParam name="cpk:Layout">
      <cpf:Option>cpk-100:custom-layout5</cpf:Option>
    </cpf:SelectiveParam>
    <cpf:SelectiveParam name="cpk:Duplex">
      <cpf:Option>cpk:OneSided</cpf;Option>
    </cpf:SelectiveParam>
    <cpf:ValueParam name="cpk:Copies">
      <cpf:Value>1</cpf:Value>
    <cpf:ValueParam>
    ...OMISSION...
</cpf:PrintTicket>
```

INFORMATION PROCESSING SYSTEM, INFORMATION PROCESSING APPARATUS, INFORMATION PROCESSING METHOD, AND STORAGE MEDIUM STORING PROGRAM

BACKGROUND OF THE INVENTION

Field of the Invention

The present invention relates to an information processing system for processing job data stored in a hot folder, an information processing apparatus, an information processing method, and a storage medium storing a program.

Description of the Related Art

In recent years, the so-called print on demand (POD) market has been expanding. In POD, a digital image forming apparatus such as a digital copying machine and a digital multifunctional peripheral performs digital printing using electronic data. As a mechanism for readily outputting electronic data to a printing apparatus in digital printing, there is a well known method of storing, in a hot folder, job data such as a content file to be printed or a print setting file. An information processing apparatus having a hot folder includes a hot folder application for monitoring job data stored in the hot folder and controlling input of job data to a print control apparatus.

When an operator stores job data in the hot folder from the application of a self apparatus (such as a PC), he/she performs an operation of copying a file contained in the job data to the folder. At this time, a problem is experienced if the hot folder application determines that the job data has been stored in the hot folder, and the job data is sent to the print control apparatus before the copy operation of the job data is completed. More specifically, since job data for which a copy operation has not been completed is an incomplete file, it may be impossible to correctly process the incomplete file when it is sent to the print control apparatus, thereby causing an unexpected error or the like. The hot folder application, therefore, needs to determine whether the job data has been stored in the hot folder. Since, however, job data to be printed is not limited to one piece of data, job data must no simply be sent to the print control apparatus when a copy operation of one job data is completed. Japanese Patent Laid-Open No. 2006-222661 describes a method in which a hot folder application is notified that job data has been stored when an application that has stored the job data in a hot folder changes the name of a job folder within the hot folder.

In the method of changing a job folder name by an application which has stored job data in a hot folder, it is impossible to change the job folder name while a large amount of job data is copied in the hot folder. The application which has stored the job data in the hot folder, therefore, needs to stand by until completion of the copy operation of the job data. Consequently, the application which has stored the job data in the hot folder cannot proceed to a next operation, thereby decreasing the operability of the user who uses the application. As an example, assume that the application is a document edit application. In this case, even if the user wants to edit a document, he/she cannot proceed to a document edit operation until the document edit application recognizes completion of a copy operation of the job data.

SUMMARY OF THE INVENTION

An aspect of the present invention is to eliminate the above-mentioned problems with conventional technology.

The present invention provides an information processing system for improving the processing efficiency in storing job data in a hot folder, an information processing apparatus, an information processing method, and a storage medium storing a program.

The present invention in its first aspect provides an information processing system comprising a first information processing apparatus for storing job data in a hot folder of a second information processing apparatus and the second information processing apparatus for processing the job data stored in the hot folder, the first information processing apparatus comprising: a storage start unit configured to start to store the job data in the hot folder; and a file storage unit configured to store a corresponding file associated with the job data in the hot folder, and the second information processing apparatus comprising: a detection unit configured to detect the corresponding file stored in the hot folder; a determination unit configured to determine, when the detection unit detects the corresponding file, whether the job data associated with the corresponding file has been stored in the hot folder; and a processing unit configured to process the job data when the determination unit determines that the job data has been stored in the hot folder.

The present invention in its second aspect provides an information processing apparatus for storing job data in a hot folder, comprising: a storage start unit configured to start to store the job data in the hot folder; and a file storage unit configured to store a corresponding file associated with the job data in the hot folder.

The present invention in its third aspect provides an information processing apparatus for processing job data stored in a hot folder, comprising: a detection unit configured to detect a corresponding file that is stored in the hot folder and associated with the job data; a determination unit configured to determine, when the detection unit detects the corresponding file, whether the job data associated with the corresponding file has been stored in the hot folder, and a processing unit configured to process the job data when the determination unit determines that the job data has been stored in the hot folder.

The present invention in its fourth aspect provides an information processing method which is executed in an information processing system including a first information processing apparatus for storing job data in a hot folder and a second information processing apparatus for processing the job data stored in the hot folder, the method comprising; in the first information processing apparatus, a storage start step of starting to store the job data in the hot folder; and a file storage step of storing a corresponding file associated with the job data in the hot folder, and in the second information processing apparatus, a detection step of detecting the corresponding file stored in the hot folder; a determination step of determining, when the corresponding file is detected in the detection step, whether the job data associated with the corresponding file has been stored in the hot folder; and a processing step of processing, when it is determined in the determination step that the job data has been in the hot folder, the job data.

The present invention in its fifth aspect provides a computer-readable storage medium storing a program for causing a computer to function, in order to process job data stored in a hot folder, to start to store the job data in the hot folder, store a corresponding file associated with the job data in the hot folder, detect the corresponding file stored in the hot folder, determine, when the corresponding file is detected, whether the job data associated with the corresponding file has been stored in the hot folder, and process, when it is determined that the job data has been stored in the hot folder, the job data.

The present invention in its sixth aspect provides a computer-readable storage medium storing a program for causing a computer to function, in order to store job data in a hot folder, to start to store the job data in the hot folder, and store a corresponding file associated with the job data in the hot folder.

The present invention in its seventh aspect provides a computer-readable storage medium storing a program for causing a computer to function, in order to process job data stored in a hot folder, to detect a corresponding file which is stored in the hot folder and associated with the job data, determine, when the corresponding file is detected, whether the job data associated with the corresponding file has been stored in the hot folder, and process, when it is determined that the job data has been stored in the hot folder, the job data.

According to the present invention, it is possible to improve the processing efficiency in storing job data in a hot folder.

Further features of the present invention will become apparent from the following description of exemplary embodiments with reference to the attached drawings.

BRIEF DESCRIPTION OF THE DRAWINGS

FIG. 5 is a flowchart illustrating a processing procedure executed by a print workflow application or the like;

FIG. 6 is a flowchart illustrating a processing procedure executed by a hot folder application;

FIG. 7 is a view showing an example of a job ticket file represented in an XML format; and FIG. 8 is a view showing an example of a print ticket file represented in an XML format.

DESCRIPTION OF THE EMBODIMENTS

Figure 1:
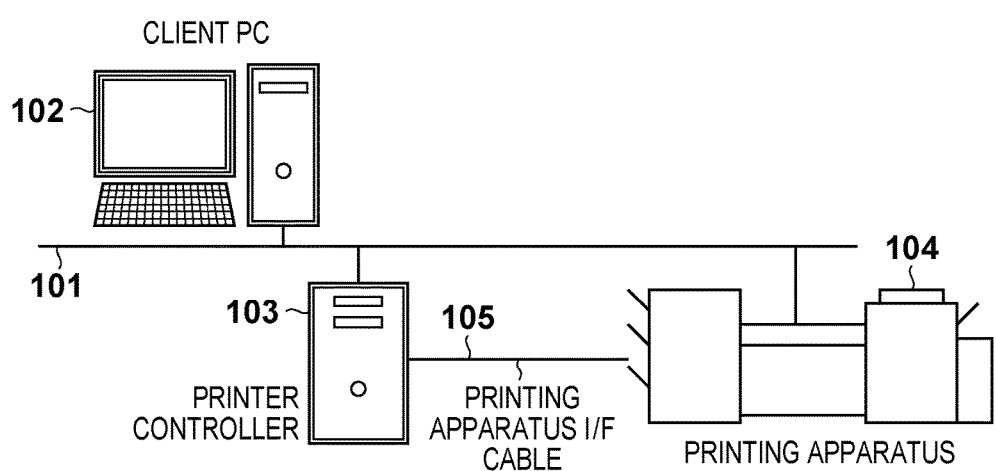
FIG. 1 is a view showing the configuration of a job monitoring system according to an embodiment.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a repetitive description thereof will be omitted.

In an embodiment of the present invention, an information processing system in which the user uses a client PC to print in a printing apparatus via a print control apparatus through a hot folder monitored by a hot folder application will be described. The information processing system functions as a job monitoring system for monitoring job data stored in the hot folder. FIG. 1 is a view showing the configuration of the job monitoring system according to the embodiment. The job monitoring system has a client computer 102 (a first information processing apparatus) such as a PC, a printer controller 103 (a second information processing apparatus), and a printing apparatus 104, all of which are connected via a network 101. The printer controller 103 and the printing apparatus 104 are connected by a printing apparatus interface (I/F) cable 105. The client PC 102 creates print job data using a print workflow application or the like in response to a print order received from the user. Note that in this embodiment, the print job data contains a content file to be printed such as PDF data or image data, a job ticket file in which job information is described, and a print ticket file in which print setting information is described. In this embodiment, the job ticket file and the print ticket file are text files described in an XML format. FIG. 7 is a view showing an example of the job ticket file represented in an XML format. FIG. 8 is a view showing an example of the print ticket file represented in an XML format.

An operator stores print job data created by software such as a print workflow application by, for example, copying the print job data in the hot folder of the printer controller 103. Based on the print job data received from the client PC 102 through the hot folder, the printer controller 103 generates, in the print control apparatus, print data in a format printable by the printing apparatus 104. Note that the print control apparatus of the present invention indicates a program having a function of generating print data interpretable by the printing apparatus.

The printer controller 103 then transmits the print data to the printing apparatus 104 via the network 101 or the printing apparatus interface (I/F) cable 105. The printing apparatus 104 prints based on the received print data. In this embodiment, the client PC 102 and the printer controller 103 are connected via the network. The present invention, however, is not limited to this and the above functions of the client PC 102 and printer controller 103 may be incorporated in one computer.

Figure 2A:
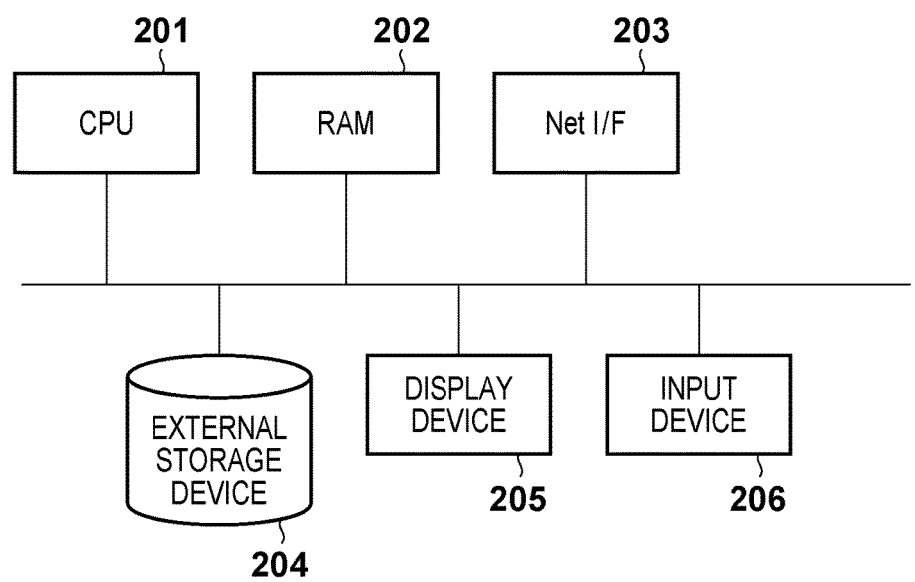
FIGS. 2A and 2B are block diagrams each showing the configuration of each apparatus in the job monitoring system.
Figure 2B:
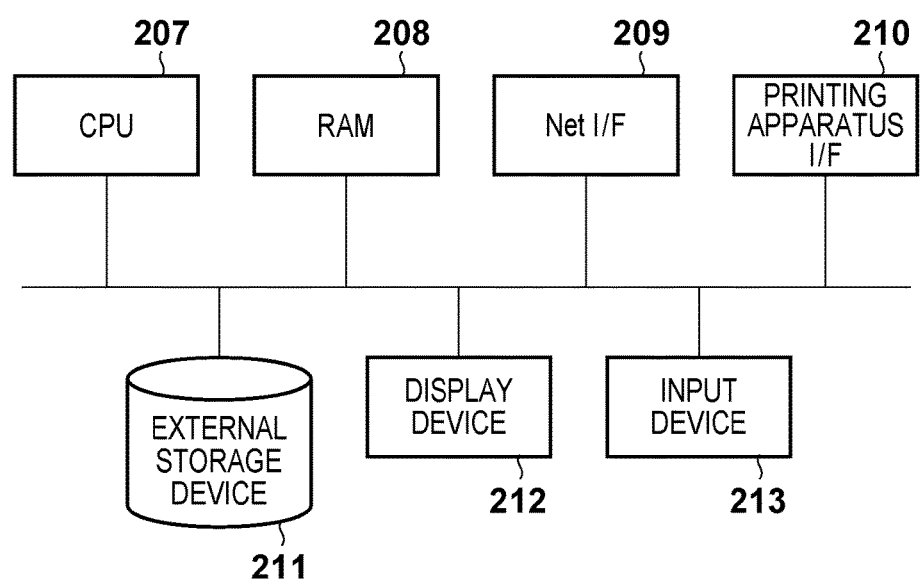

The configuration of each apparatus according to the embodiment will be described with reference to FIGS. 2A and 2B.

Configuration of Client PC

The client PC 102 will be explained with reference to FIG. 2A. FIG. 2A is a block diagram showing an example of the hardware configuration of the client PC 102 according to the embodiment. Although an example of the hardware of the client PC 102 will be described, a configuration including various generally known connection methods, a bus, and an interface may be used. A CPU 201 controls the apparatus as a whole according to a control program loaded in a RAM 202. The RAM 202 reads and stores a control program of the apparatus executed by the CPU 201, and data such as documents and images. A network interface (Net I/F) 203 is used to transmit/receive data and the like by connecting with the Internet or the like under control of the CPU 201. An external storage device 204 is a hard disk drive (HDD) for storing various kinds of data in addition to control software of the client PC 102. A display device 205 is, for example, a display. An input device 206 is a pointing device, a keyboard, or the like. Various kinds of software stored in the external storage device 204 are loaded in the RAM 202 as needed, and are executed under control of the CPU 201 using, as needed, a function of an operating system (OS) loaded in the RAM 202.

Configuration of Printer Controller

The hardware configuration of the printer controller 103 will be described with reference to FIG. 2B. FIG. 2B is a block diagram showing an example of the hardware configuration of the printer controller 103 used in the embodiment. Although an example of the hardware configuration of the printer controller 103 will be explained, a configuration including various generally known connection methods, a bus, and an interface may be used. A CPU 207 controls the apparatus as a whole according to a control program loaded in a RAM 208. The RAM 208 reads and stores a control program of the apparatus executed by the CPU 207, and data such as a document and image. A network interface (Net I/F) 209 is used to transmit/receive data and the like by connecting with a network under control of the CPU 207. An external storage device 211 is a hard disk drive (HDD) for storing various kinds of data in addition to control software of the printer controller 103. A display device 212 is, for example, a display. An input device 213 is a pointing device such as a mouse, a keyboard, or the like. A printing apparatus interface (I/F) 210 is connected with the printing apparatus 104 via the printing apparatus interface (I/F) cable 105, and is used to transmit print data. Various kinds of software stored in the external storage device 211 are loaded in the RAM 208 as needed, and are executed under control of the CPU 207 using, as needed, a function of an operating system loaded in the RAM 208.

Figure 3:
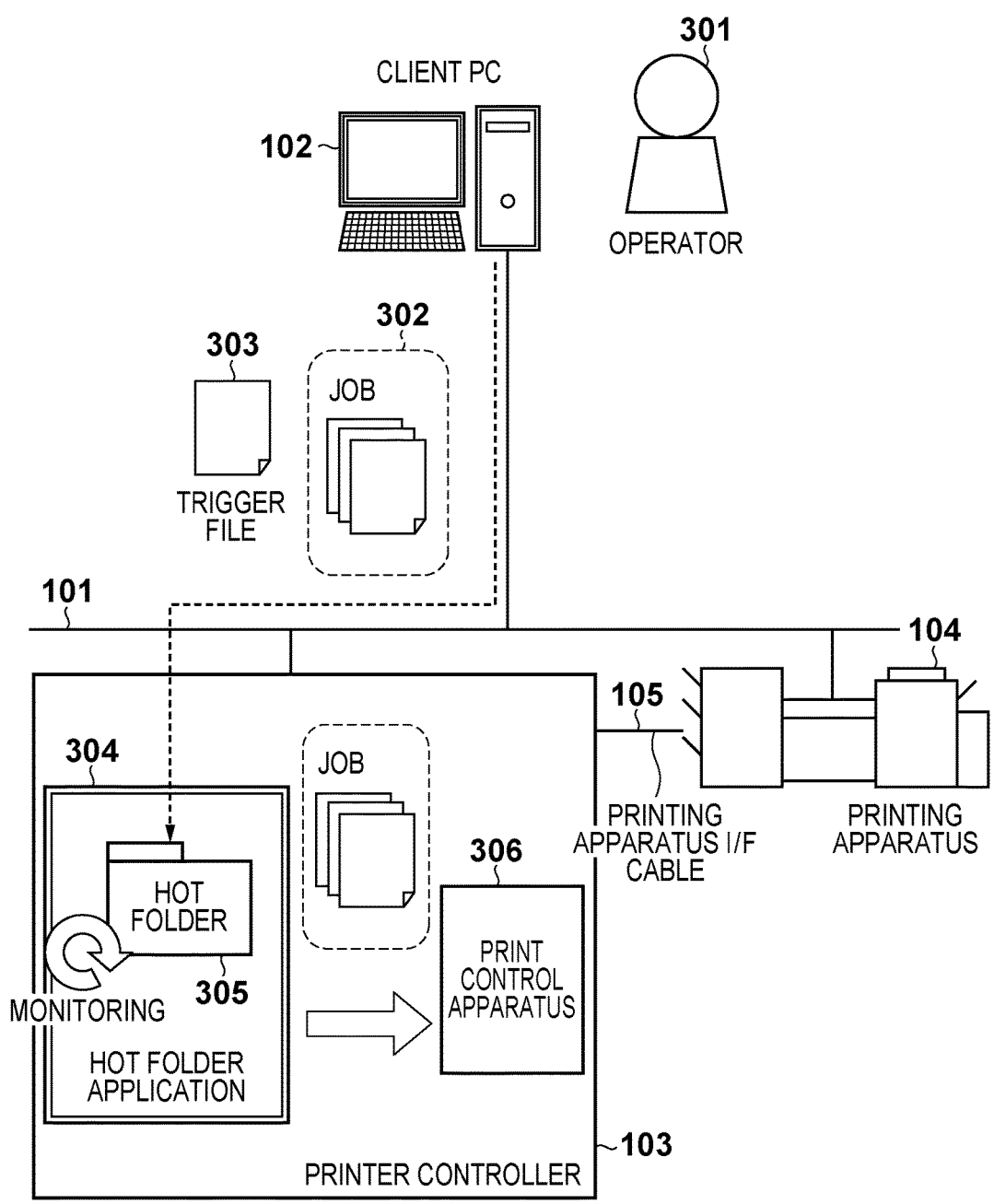
FIG. 3 is a view for explaining a processing procedure of monitoring a hot folder.
Figure 4:
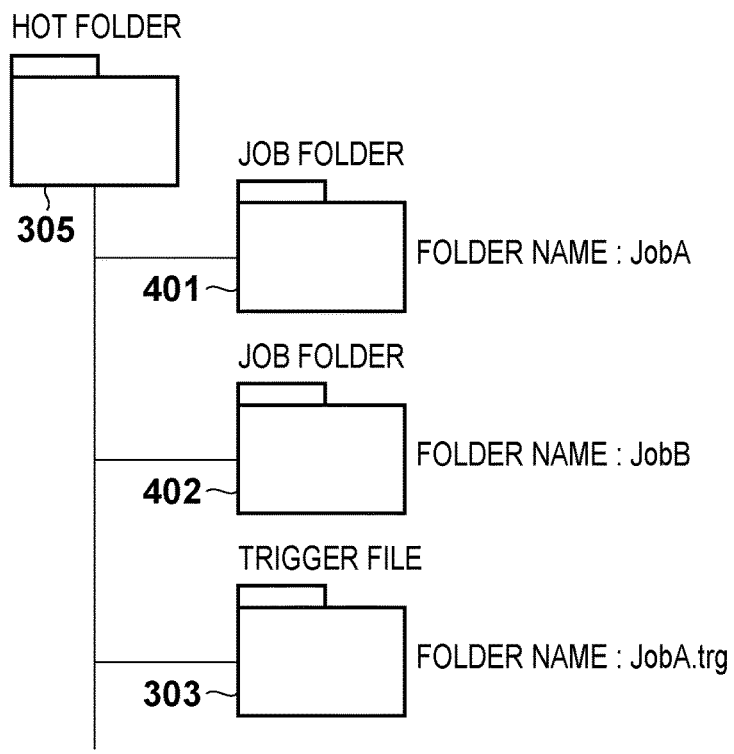
FIG. 4 is a view showing the structure of the hot folder.
Figure 5:
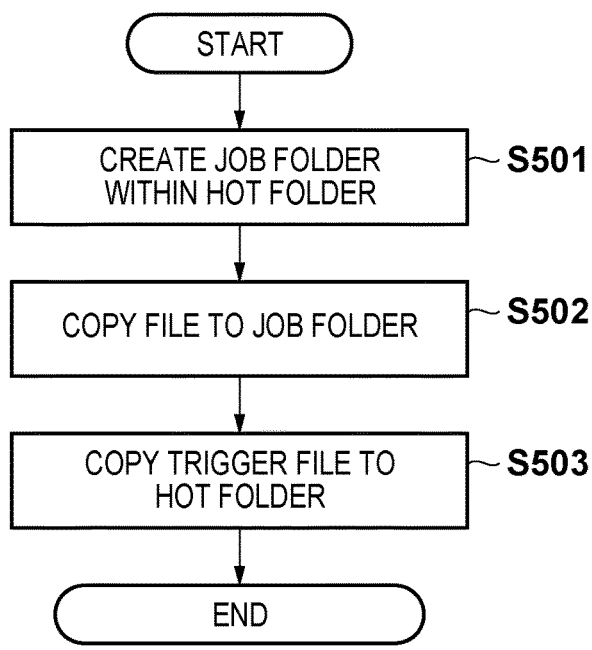

A processing procedure of monitoring a hot folder according to the embodiment will be described with reference to FIGS. 3 to 6. FIG. 3 is a view for explaining the processing procedure of monitoring a hot folder. FIG. 4 is a view showing the structure of a hot folder 305. FIG. 5 is a flowchart illustrating a processing procedure executed by the print workflow application or the like. FIG. 6 is a flowchart illustrating a processing procedure executed by the hot folder application. Each process of FIG. 5 is executed by, for example, the CPU 201 of the client PC 102. Each process of FIG. 6 is executed by, for example, the CPU 207 of the printer controller 103.

An operator 301 creates print job data using the print workflow application or the like in the client PC 102. In this system, the operator 301 uses the hot folder 305 monitored by a hot folder application 304 to transmit the print job data to the printing apparatus 104 via a print control apparatus 306, and executes printing in the printing apparatus 104. Note that in this embodiment, the hot folder application 304 and the print control apparatus 306 are assumed to have been installed in one computer.

The hot folder application 304 creates the hot folder 305. The hot folder 305 may be created in the external storage device 211 of the printer controller 103 which has been installed with the hot folder application 304, or the external storage device 204 of the client PC 102 connected by the network. Since print job data is read and written via the network, the hot folder 305 is created as a shared folder which gives an access right and has an attribute for enabling reading and writing. A plurality of hot folders 305 may be created instead of one hot folder 305, as a matter of course.

To print, the operator 301 uses the print workflow application or the like to create a trigger file 303 while preparing print job data 302 containing a content file, a job ticket file, and a print ticket file. The trigger file 303 is a corresponding file which has an arbitrary file name associated with the job name of the created job data, has an extension ".trg", and contains null data. Note that in this embodiment, the trigger file need not be a null file. In response to an instruction from the operator 301, the print workflow application creates, within the hot folder 305, a job folder 401 with an arbitrary folder name corresponding to a job (S501). In response to an instruction from the operator 301, the print workflow application starts to store the print job data 302 in the job folder 401 by performing a copy operation or the like (S502: start of storage). In response to an instruction from the operator 301, the print workflow application stores the trigger file 303 at the same level as that of the job folder 401 by performing a copy operation or the like without standing by for completion of the copy operation of the print job data 302 in the job folder 401 (S503: file storage). Note that the print workflow application may create the job folder 401 with a folder name corresponding to the trigger file 303 to store the print job data 302 in the job folder 401 in advance, and then store the job folder 401 in the hot folder 305 by performing a copy operation or the like.

When the hot folder application 304 detects creation of the job folder 401 in the hot folder 305 (S601), it checks the detected job folder 401, and monitors a copy state of a file (S602). The application 304, for example, detects and monitors a change within the hot folder 305 such as addition of a file or folder to the hot folder 305 by acquiring an event issued by the operating system. When monitoring a hot folder 305 in another computer connected by the network, the hot folder application 304 may not be able to acquire an event. In such a case, the hot folder application 304 may check the hot folder 305 at a specified monitoring interval, and then detect and monitor a change within the hot folder 305.

When the hot folder application 304 detects storage of a file in the hot folder 305 (S603), it determines whether its file name is "a job folder name being monitored+".trg"". If it is determined as a result of the determination that the file name is "a job folder name being monitored+".trg"", the hot folder application 304 identifies the file as a trigger file (S604). Upon identifying the file as the trigger file 303, the hot folder application 304 determines whether the file (that is, the print job data 302) stored in the job folder 401 being monitored is being copied (S605). In the embodiment, based on the fact that when the file is copied, it is in a locked state immediately after the copy operation starts until the copy operation is completed, the hot folder application 304 determines whether the file is being copied. Note that whether a copy operation is in progress is determined for a file for which a copy operation to the job folder 401 starts before the trigger file 303 is copied. That is, the hot folder application 304 monitors and processes a file which exists before the trigger file is copied or a file which is being copied and thus in a locked state. If, therefore, the hot folder application 304 detects a new file being copied in the job folder as a monitoring target after the trigger file is copied (S607), it notifies the operation of an error (S608), and ends the processing. More specifically, the application 304 sends a message indicating that a file (for example, job data) which is newly stored in a job folder to which a trigger file has been copied may not be printed.

On the other hand, if, in step S605, the locked states of all files within the job folder 401 have been canceled, the hot folder application 304 moves a file containing the trigger file 303 to another folder. The hot folder application 304 then inputs the print job data 302 to the print control apparatus 306 by calling the application program interface (API) of the print control apparatus 306 (S606). Upon inputting the print job data, the processing (job monitoring) of the hot folder application 304 ends.

Effects obtained by using the processing of the present invention will be described using an example. Assume, for example, that the operator wants to sequentially print a plurality of job data (job data 1 and 2). If the hot folder application sends only first job data 1 to the print control apparatus in response to completion of a copy operation of first job data 1, job data 1 and 2 are not sequentially printed when another job data is sent to the print control apparatus before a copy operation of second job data 2 is completed. Therefore, the print workflow application stores a corresponding trigger file immediately following a copy operation of job data 1 and 2 in the job folder, thereby passing job data 1 and 2 to the print control apparatus after the copy operation of job data 1 and 2 is completed. This can prevent a printed material of another job data from existing between job data 1 and 2.

Even if there is a plurality of print job data to be printed, the operator 301 uses the print workflow application to store print job data in the job folder 401 within the hot folder, and then stores the trigger file 303 in the hot folder 305 by performing a copy operation or the like. Immediately after the trigger file is stored, the operator 301 can start operation for the next print job data.

That is, the operator 301 continuously uses the print workflow application to create a job folder 402 with a name different from that of the job folder 401 within the hot folder 305. The operator 301 then stores the new print job data in the job folder 402 by performing a copy operation or the like. The operator 301 stores a trigger file corresponding to the job folder 402 at the same level as that of the job folder 402 by performing a copy operation or the like without standing by for completion of the copy operation of the job data in the job folder 402. This processing eliminates the need for the operator 301 (or the print workflow application) to stand by for a copy operation of job data in the job folder 401.

The print control apparatus 306 converts the content data contained in the print job data 302 received from the hot folder application 304 into print data in a format printable by the printing apparatus. The conversion processing is executed according to settings of the job ticket file and print ticket file contained in the print job data 302. In this embodiment, each process such as a conversion process may be executed according to contents set in the hot folder 305 instead of the settings of the job ticket file and print ticket file contained in the print job data 302. In this case, the operator 301 need only use the print workflow application or the like to execute printing, and prepare the print job data 302 containing the content file. The print control apparatus sequentially transmits the print data to the printing apparatus 104. The printing apparatus 104 prints based on the received print data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-009200, filed Jan. 19, 2011, which is hereby incorporated by reference herein in its entirety.

What is claimed is:

1. An information processing apparatus comprising:
a monitor unit configured to monitor inputting a file into a first folder;
a matching detection unit configured to detect that a folder name of a second folder which is a sub-directory of the first folder matches at least part of a file name of a file input into the first folder; and
a control unit configured (i) to, based on that the folder name of the second folder matches at least part of the file name of the file input into the first folder, process a plurality of files in the second folder and send a plurality of print jobs for the plurality of files to a print apparatus, and (ii) to, based on that the folder name of the second folder does not match at least part of the file name of the file input into the first folder, withhold processing of a plurality of files in the second folder and sending a plurality of print jobs for the plurality of files to the print apparatus until said matching detection unit detects that the folder name of the second folder matches at least part of the file name of the file input into the first folder,
wherein, based on that the folder name of the second folder matches at least part of the file name of the file input into the first folder, said control unit processes the plurality of files that exist in the second folder by the file which is input into the first folder and is one file, and a plurality of print jobs are sent to the print apparatus.

2. The information processing apparatus according to claim 1, wherein said matching detection unit detects that whether or not the folder name of the second folder matches at least part of the file name of the file input into immediately below the first folder.

3. The information processing apparatus according to claim 1, further comprising a determination unit configured to, based on that the folder name of the second folder matches at least part of the file name of the file input into the first folder, determine whether or not lock states of the plurality of files in the second folder are released,
wherein, in a case where said determination unit determines that the lock states of the plurality of files in the second folder are released, said control unit processes the plurality of files in the second folder by processing the file which is input into the first folder and is one file, and sends a plurality of print jobs to the print apparatus.

4. The information processing apparatus according to claim 3, further comprising a second determination unit configured to determine whether or not a new file is input into the second folder,
wherein, in a case where said second determination unit determines that the new file is input while said determination unit determines that the lock states of the plurality of files in the second folder are not released, said control unit notifies an error to a user.

5. The information processing apparatus according to claim 1, wherein the plurality of files in the second folder include a content file for printing, a job ticket file in which job information is described, and a print ticket file in which print setting information is described.

6. An information processing method for an information processing apparatus comprising:

a monitor step of monitoring inputting a file into a first folder;

a matching detection step of detecting a folder name of a second folder which is a sub-directory of the first folder matches at least part of a file name of a file input into the first folder; and a control step (i) of, based on that the folder name of the second folder matches at least part of the file name of the file input into the first folder, processing a plurality of files in the second folder and sending a plurality of print jobs for the plurality of files to a print apparatus, and (ii) of, based on that the folder name of the second folder does not match at least part of the file name of the file input into the first folder, withholding processing a plurality of files in the second folder and sending a plurality of print jobs for the plurality of files to the print apparatus until the matching detection step of detecting that the folder name of the second folder matches at least part of the file name of the file input into the first folder, wherein, based on that the folder name of the second folder matches at least part of the file name of the file input into the first folder, said control step processes the plurality of files that exist in the second folder by the file which is input into the first folder and is one file, and a plurality of print jobs are sent to the print apparatus.

7. The information processing method according to claim 6, wherein said matching detection step detects that whether or not the folder name of the second folder matches at least part of the file name of the file input into immediately below the first folder.

8. The information processing method according to claim 6, further comprising a determination step of determining, based on that the folder name of the second folder matches at least part of the file name of the file input into the first folder, whether or not the lock states of the plurality of files in the second folder are released, wherein, in a case where said determination step determines that the lock states of the plurality of files in the second folder are released, said control step processes the plurality of files in the second folder by processing the file which is input into the first folder and is one file, and sends a plurality of print jobs to the print apparatus.

9. The information processing method according to claim 8, further comprising a second determination step of determining whether or not a new file is input into the second folder, wherein, in a case where said second determination step determines that the new file is input while said determination step determines that the lock states of the plurality of files in the second folder are not released, said control step notifies an error to a user.

10. The information processing method according to claim 6, wherein the plurality of files in the second folder include a content file for printing, a job ticket file in which job information is described, and a print ticket file in which print setting information is described.

11. A non-transitory computer-readable storage medium storing a program for causing a computer to perform the following steps, the steps comprising:

a monitor step of monitoring inputting a file into a first folder;

a matching detection step of detecting that a folder name of a second folder which is a sub-directory of the first folder matches at least part of a file name of a file input into the first folder; and a control step (i) of, based on that the folder name of the second folder matches at least part of the file name of the file input into the first folder, processing a plurality of files in the second folder and sending a plurality of print jobs for the plurality of files to a print apparatus, and (ii) of, based on that the folder name of the second folder does not match at least part of the file name of the file input into the first folder, withholding processing a plurality of files in the second folder and sending a plurality of print jobs for the plurality of files to the print apparatus until the matching detection step detects that the folder name of the second folder matches at least part of the file name of the file input into the first folder, wherein, based on that the folder name of the second folder matches at least part of the file name of the file input into the first folder, said control step processes the plurality of files that exist in the second folder by the file which is input into the first folder and is one file, and a plurality of print jobs are sent to the print apparatus.

12. The non-transitory computer-readable storage medium according to claim 11, wherein said matching detection step detects that determines whether or not the folder name of the second folder matches at least part of the file name of the file input into immediately below the first folder.

13. The non-transitory computer-readable storage medium according to claim 11, further comprising a determination step of determining, based on that the folder name of the second folder matches at least part of the file name of the file input into the first folder, whether or not lock states of the plurality of files in the second folder are released, wherein, in a case where said determination step determines that the lock states of the plurality of files in the second folder are released, said control step processes the plurality of files in the second folder by processing the file which is input into the first folder and is one file, and sends a plurality of print jobs to the print apparatus.

14. The non-transitory computer-readable storage medium according to claim 13, further comprising a second determination step of determining whether or not a new file is input into the second folder, wherein, in a case where said second determination step determines that the new file is input while said determination step determines that the lock states of the plurality of files in the second folder are not released, said control step notifies an error to a user.

15. The non-transitory computer-readable storage medium according to claim 11, wherein the plurality of files in the second folder include a content file for printing, a job ticket file in which job information is described, and a print ticket file in which print setting information is described.

* * * * *